United States Patent [19]
Yang

[11] Patent Number: 5,615,540
[45] Date of Patent: Apr. 1, 1997

[54] ELECTRICITY DRIVEN DEVICE AND METHOD FOR INCREASING THE ROTATIONAL INERTIA OF A ROTARY OBJECT OR THE BLADE OF A LAWN MOWER

[76] Inventor: Chen-Chi Yang, P.O. Box 10780, Taipei, Taiwan

[21] Appl. No.: 457,534

[22] Filed: Jun. 1, 1995

[51] Int. Cl.⁶ .................................................. A01D 34/78
[52] U.S. Cl. .......................... 56/11.9; 56/17.5; 56/DIG. 6
[58] Field of Search ....................................... 56/11.9, 11.1, 56/11.2, 11.8, 17.5, 255, 295, DIG. 17, DIG. 20, DIG. 2, DIG. 4, DIG. 6; 30/276; 173/171

[56] References Cited

U.S. PATENT DOCUMENTS

| | | | |
|---|---|---|---|
| 3,667,304 | 6/1972 | Puffer et al. | 476/24 X |
| 4,250,622 | 2/1981 | Houle | 56/295 X |
| 4,277,936 | 7/1981 | Hoff | 56/11.7 |
| 5,274,987 | 1/1994 | Wiener | 56/225 X |

*Primary Examiner*—Terry Lee Melius
*Attorney, Agent, or Firm*—Pollock, Vande Sande & Priddy

[57] ABSTRACT

An electricity driven device for rotating a rotary object to increase the rotational inertia of the rotary object. The device includes a fixed and non-rotating main shaft. A fixed element is secured with the main shaft. A rotary element is arranged so as to rotate about the fixed element at a periphery of the fixed element. A coupler is secured with the rotary object. The device also includes an electromagnetic field generating device that includes a first part and a second part. A plurality of coils and a plurality of permanent magnets are provided between the first part and the second part such that an electromagnetic field is generated therebetween when the coils are supplied with electric current, so that the first part and the second part perform relative rotation. The first part of the electromagnetic field generating device is secured on the fixed element. The second part of the electromagnetic field generating device is secured on the rotary element. The coupler is coupled to the rotary object and is pivotally disposed on the main shaft, such that when the rotary element rotates, the coupler and the rotary object coupled thereto rotate therewith to increase the rotational inertia. The device also includes a power supply for transmitting power to the coils.

25 Claims, 4 Drawing Sheets

ELECTRICITY DRIVEN DEVICE AND METHOD FOR INCREASING THE ROTATIONAL INERTIA OF A ROTARY OBJECT OR THE BLADE OF A LAWN MOWER

FIELD OF THE INVENTION

The present invention relates generally to an electricity driven device and method. More particularly, the present invention relates to an electricity driven device and method in which the rotational inertia of a rotary object or the blade of a power mower may be increased.

BACKGROUND OF THE INVENTION

Diesel oil or gasoline engines are widely used power sources for rotating the blade of a power mower. As is generally known, because the noise generated during operation of the engine is big, mowing is often restricted to a stipulated period of time in residential areas. Despite this, the noise generated by the engine is still very disturbing.

Some nations have grave concern about the disturbing noise caused by power mowers. Some have even made laws to prohibit use of power mowers in residential areas.

At present, the only device to replace the power mower is one that utilizes a conventional motor that is mounted on the lawn mower, in which a rotary shaft of the motor is directly linked to the shaft of the mower's blade to drive the blade. The rotary torque required by the blade during mowing comes from the rotary shaft of the motor. The rotary shaft is driven by a rotor located in the central portion of the motor. As a general rule, the rotor has a plurality of coils which, when electric currents are conducted therethrough, will generate an electromagnetic field in cooperation with a plurality of magnets on the housing of the motor. The electromagnetic field thus generated rotates the rotor and the rotary shaft. Nonetheless, the rotary shaft that transmits the power has a limited diameter. Therefore, the inertia generated during rotation of the rotor and the rotary shaft is limited. In addition, when the blade of the lawn mower operates, it will periodically reduce its rotational speed upon contact with the grass stalks, resulting in the rise in coil resistance on the rotor so that the coils become heated. The heat generated by the coils in the motor is difficult to dissipate.

Hence, if the conventional motor is directly used to provide power for the blade of the lawn mower, consumption of electric power will be greatly increased due to the rise in coil resistance. Batteries are, therefore, not suitable as a power source. In other words, a lawn mower using the conventional motor as a power source has to be equipped with very long electric wires. Consequently, the mower will increase in weight; its construction will be more complicated; and it will be inconvenient to operate or move the mower. Another problem is that the lawn mower cannot be continuously operated for a long period of time since the heat generated by the coils cannot be easily dissipated.

SUMMARY OF THE INVENTION

A primary object of the present invention is to provide an electricity driven device and method for a lawn mower, that has low power consumption and will not generate high heat.

Another object of the present invention is to provide a silent power device adapted for driving the blade of a lawn mower and increasing the rotational inertia of the blade to enhance the cutting efficiency of the blade.

Still another object of the present invention is to provide an electricity driven device and method adapted for driving the blade of a lawn mower and similar rotary objects such as a grinding wheel or a disc saw or the like.

A further object of the present invention is to provide an electricity driven device and method in which the heat generated by the coils of the motor is easily dissipated so that the coil resistance will not rise as a result of prolonged work, hence reducing power consumption and enabling batteries to be used as a power source.

To achieve the above-mentioned objects, the electricity driven device and method according to the present invention mainly comprises a fixed and non-rotating shaft having a stator secured thereon and a rotor pivotally provided thereon by means of a bearing. An electromagnetic field generating device is disposed between a periphery of the stator and an inner rim of the rotor. In a preferred embodiment, a plurality of magnets are arranged around the periphery of the stator and a plurality of coils are disposed at the inner rim of the rotor, in which electric currents are supplied to the coils to generate an electromagnetic field between the stator and the rotor. In another preferred embodiment, a plurality of coils are disposed around the periphery of the stator electric currents are supplied to the coils, and a plurality of magnets are provided at the inner rim of the rotor so that an electromagnetic field is generated between the stator and the rotor. According to the device of the present invention, the rotor is connected to a coupler at a front end of the shaft and the coupler is used to securely connect to a disc-like rotary object, such as the blade of a lawn mower or a grinding wheel. As the rotor is disposed at the outermost part of the overall device, the rotor brings the coupler and the rotary object to rotate therewith, increasing the rotational inertia.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
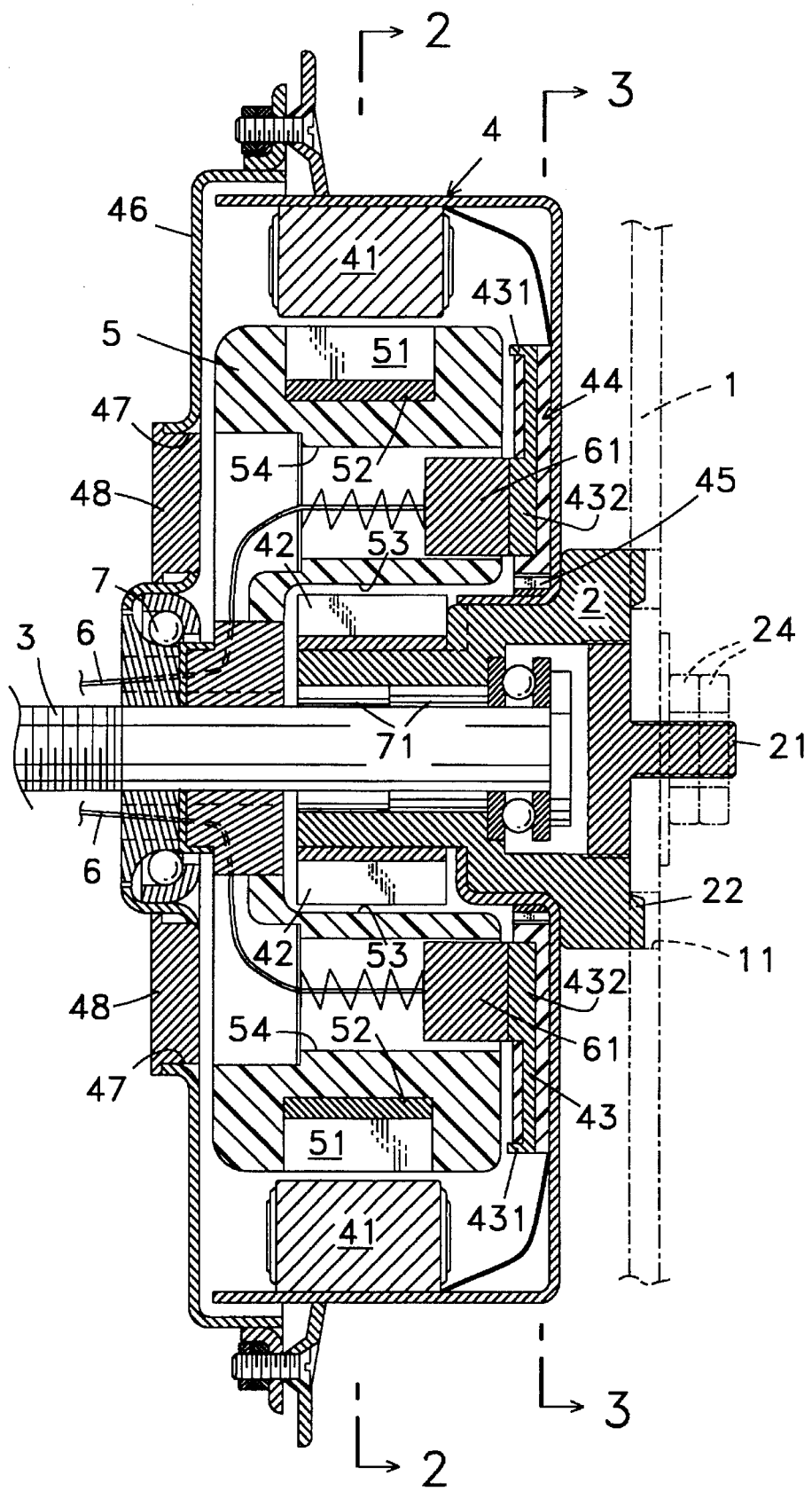
FIG. 1 is a sectional view a first preferred embodiment of the device according to the present invention.

A method of increasing the rotational inertia of the blade of a lawn mower or a rotary object according to the present invention comprises securing a fixed element on a main shaft; pivotally providing a rotary element at a periphery of the securing element; generating an electromagnetic field between the fixed element and the rotary element so as to rotate the rotary element; providing a coupler on the rotary element in the vicinity of an end portion of the main shaft, and securing the rotary object onto the coupler.

As shown in FIGS. 1 to 4, the electricity driven device according to the present invention is adapted for matching a rotary object 1 of any type, such as a grinding wheel, a disc saw, or the blade of a lawn mower and the like. Certainly, in the device according to the present invention, a coupler 2 mounted at a front end of a rotary element 4 will need some modifications in order to match the rotary object 1. As shown in the drawings, the coupler 2 is only an example employed to match the blade of the lawn mower. Needless to say, if the device is adapted for use in other rotary objects, the structure of the coupler will be modified.

When the rotational inertia of a rotary object increases, the tangential force of the rotary object also increases. This produces an improvement in the action, such as the grinding action or cutting action, of the rotary object, as is well known to those skilled in the art. The rotary element 4, commonly known as the rotor, of the present invention provides a greater rotational inertia than the conventional electricity driven device and method.

In the field of Elements of Mechanism, according to an equation developed from Newton's laws of motion concerning influential factors on the linear speed or peripheral speed of any one point on the circumference of a rotary wheel, it was found that $Va=\omega Ra$, wherein Va refers to the linear speed of mass point A on the wheel, $\omega$ refers to the angular speed, and Ra refers to the radius from mass point A to the center of rotation. Therefore, it can be seen that the length of the radius from the mass point A to the center will affect the peripheral speed, that is, the rotational inertia of the rotary wheel. The greater the radius, the greater the peripheral speed.

The coupler 2 is driven by the rotary element 4. Since they are joined together as a whole, they have a common radius of mass point, which is greater than that of a conventional motor's shaft and the rotor fixed on the shaft as a whole. Hence, the device and method according to the present invention provides a greater rotational inertia than a conventional electricity driven device.

The electromagnetic field generating device of the present invention consists of two parts, which are constituted by coil sets and magnet sets. The coil sets and magnet sets include a plurality of coils and a plurality of permanent magnets radially distributed on the same circumference, respectively. When electric currents are supplied to the coils, an electromagnetic field is generated between the coils and the magnets. The first part of the electromagnetic field generating device is secured at the periphery of the fixed element (commonly known as the stator), while the second part thereof is secured at the inner rim of the rotary element.

Figure 2:
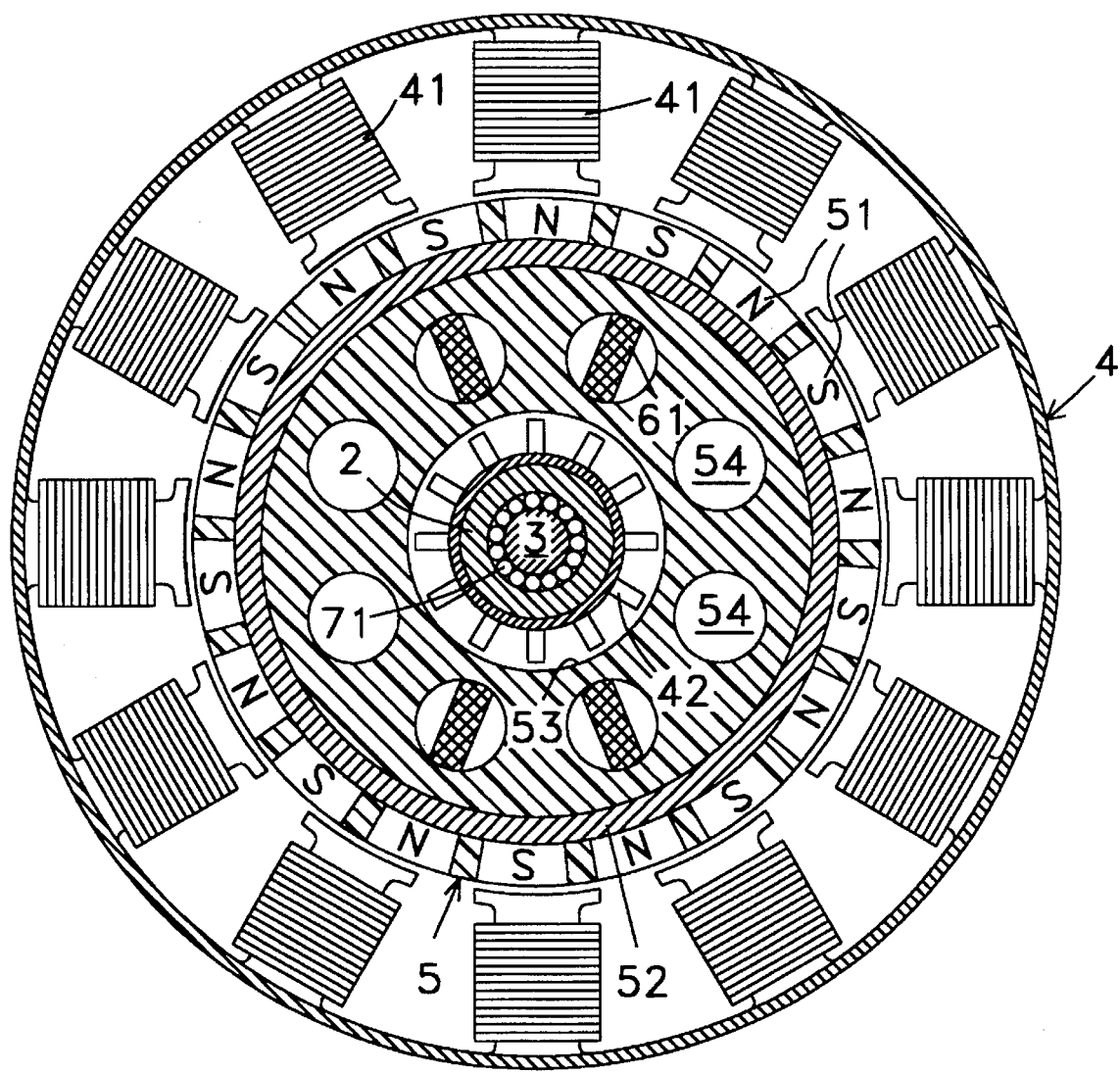
FIG. 2 is a sectional view taken along line 2—2 of FIG. 1.
Figure 3:
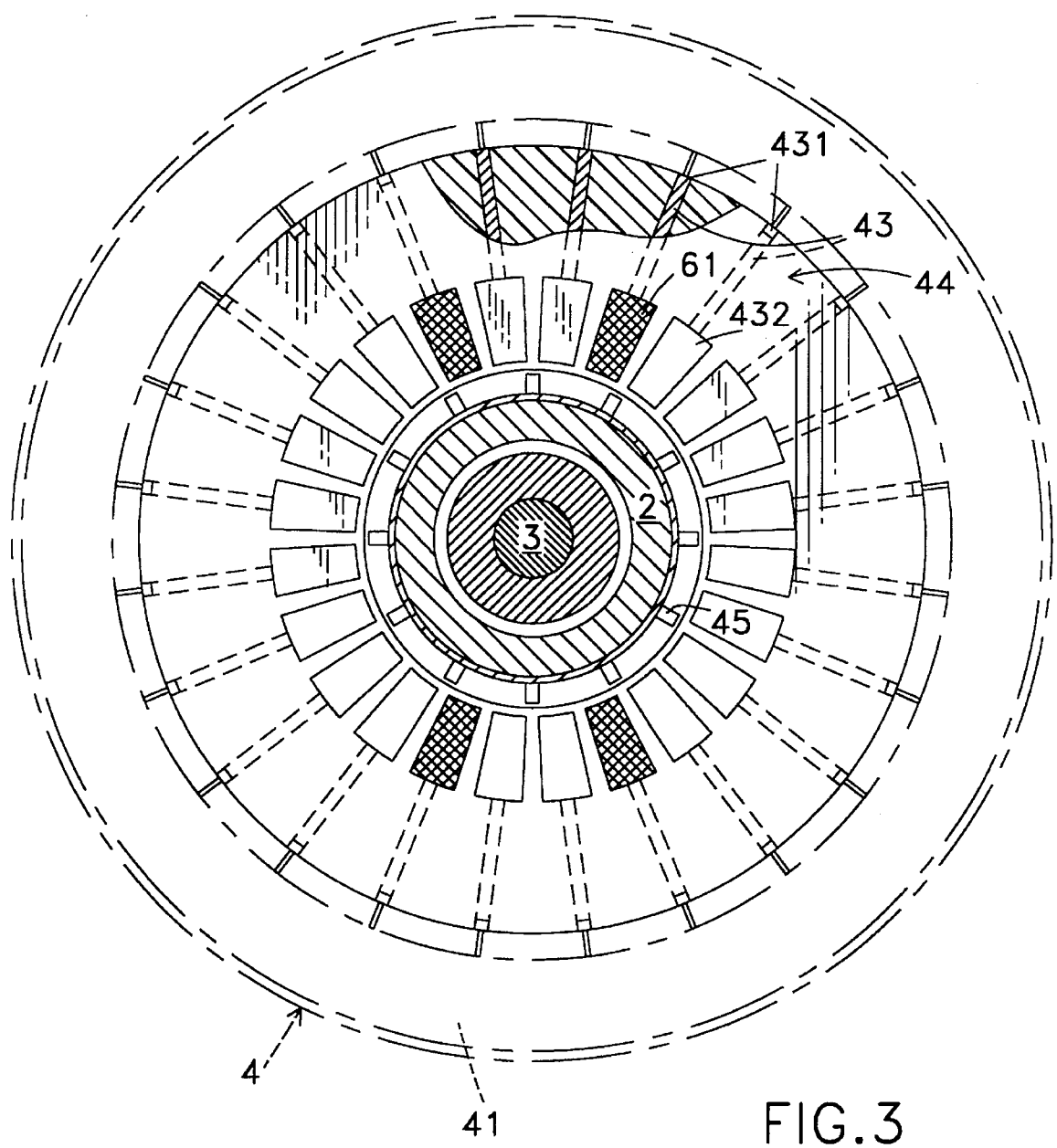
FIG. 3 is a sectional view taken along line 3—3 of FIG. 1.
Figure 4:
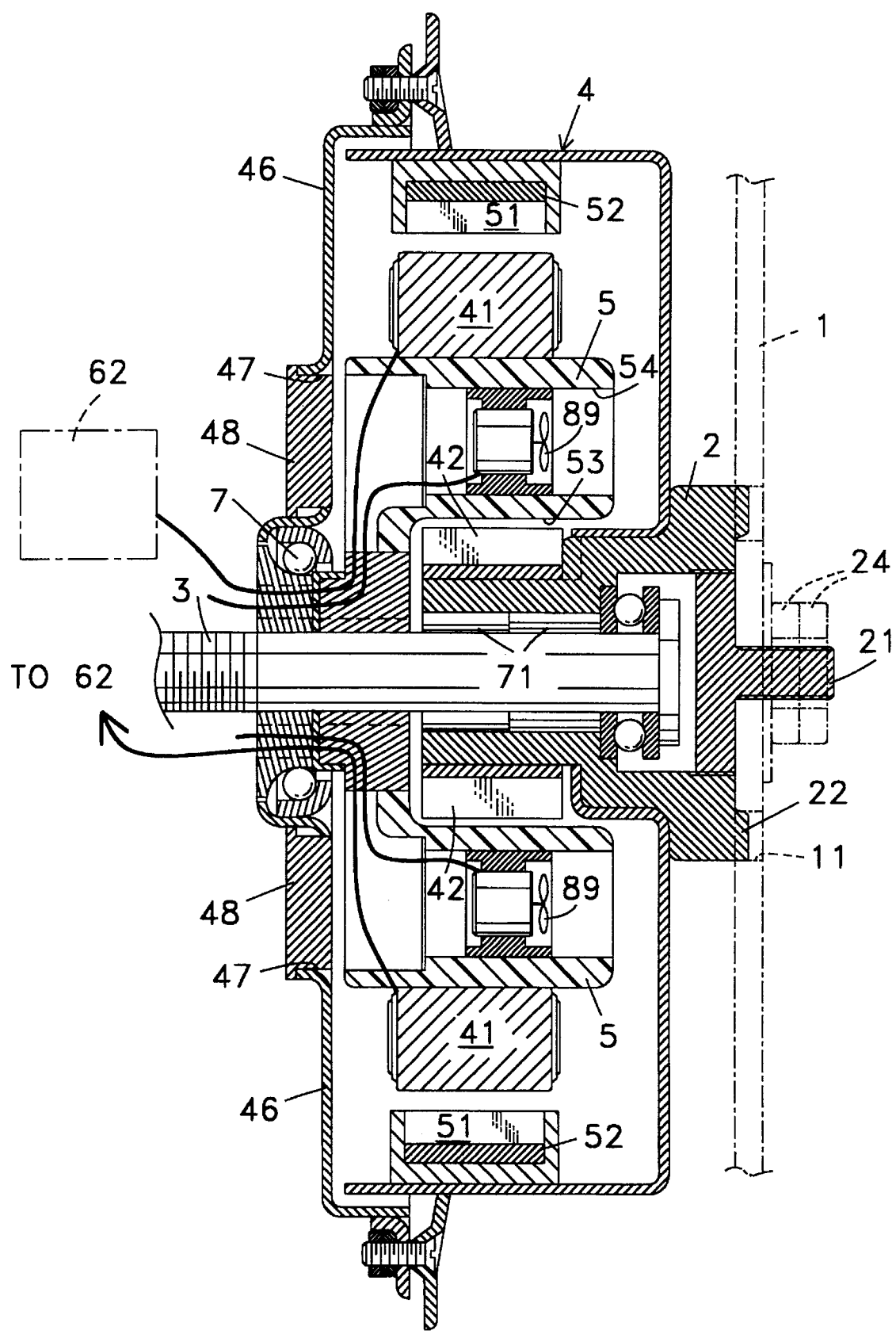
FIG. 4 is similar to FIG. 1, but showing another preferred embodiment.

In the second preferred embodiment of the present invention as shown in FIG. 4, the first part of the electromagnetic field generating device is constituted by a plurality of coils. Correspondingly, the second part consists of a plurality of permanent magnets. In the first preferred embodiment as shown in FIGS. 1 to 3, the first part consists of a plurality of permanent magnets while the second part consists of a plurality of coils.

The structure of the two preferred embodiments of the device according to the present invention will now be described below in detail.

In the first preferred embodiment, the device according to the present invention comprises an annular fixed element 5 secured on a non-rotating main shaft 3. The fixed element 5 has a plurality of permanent magnets 51 arranged radially around the periphery thereof. A bearing 7 is pivotally provided on the rotary element 4 on the main shaft 3. The rotary element 4 has a part thereof extending around the periphery of the fixed element 5. A plurality of winding coils 41 are disposed at the inner rim of the extended portion of the rotary element 4. When the coils 41 are supplied with electric currents, they may generate an electromagnetic field with the permanent magnets 51 to drive the rotary element 4.

The device further comprises power supply means 6 for transmitting electric currents via carbon brushes 61 to the coils 41 of the rotary element 4. The rotary element 4 has a part thereof extending to a front end of the main shaft 3 to form a coupler 2 for connection to the disc-like rotary object 1. In FIGS. 1 and 4, the coupler 2 is pivotally provided on the main shaft 3 by means of the bearing 7. The coupler 2 is actually connected to the rotary element 41 as an integral whole so that they may rotate together.

The fixed element 5 is preferably made of insulated engineering plastic, so that the permanent magnets 51 may be directly secured to the periphery of the fixed element 5 during plastic molding of the fixed element 5. As shown in FIG. 2, a metal ring 52 is disposed at a bottom side of each permanent magnet 51 to form a magnetic path.

A recess 53 is formed in the center of the fixed element 5. The rotary element 4 has a first vane wheel 42 pivotally provided on the main shaft 3. With the carbon brushes 51 arranged around its periphery, the first vane wheel 42 shown in FIG. 2 is located in the recess 53 of the fixed element 5. The first vane wheel 42 is secured with the rotary element 4, such that when the rotary element 4 rotates, a centrifugal air current is generated to cause the carbon brushes 61 and all other conductive components to dissipate heat and to blow off the carbon powder. By dissipating heat and blowing off carbon powder, the device of the present invention will not become heated due to prolonged operation. The resistance will be maintained at a stable level since the temperature of the conductive components does not rise. In other words, power consumption during prolonged operation may be reduced.

As shown in FIG. 3, the rotary element 4 has a conductive ring 44 with a plurality of radially distributed conductive sheets 43. Each conductive sheet has an outer end 431 and an inner end 432. Each outer end 431 is connected to one coil 41 (as shown in FIG. 1), while each inner end 432 has a side thereof in contact with one of the carbon brushes 61.

As shown in FIGS. 1 and 3, the rotary element 4 may be further provided with a second vane wheel 45 that is located around the coupler 2 with the conductive ring 4 on the outside. The second vane wheel 45 helps dissipate the heat generated by the conductive ring 44 by generating a centrifugal air current.

As shown in FIG. 1, the rotary element 4 has a housing 46 for covering the coils 41, conductive ring 44, first vane wheel 42, second vane wheel 45, permanent magnets 51 and power supply means 6 of the fixed element 5. The fixed element 5 is provided with a plurality of axial holes 54 that are substantially parallel to the main shaft 3 and are radially distributed on the same circumference for receiving the carbon brushes 61. The housing 46 is provided with at least a hole 47 sharing the same center line with the axial hole 54, and having a cap 48 fitted thereon a cap 48. A preferred embodiment is to have the number of holes 47 equivalent to that of the axial holes 54 of the fixed element 5. The cap 48 on each hole 47 facilitates the replacement of the carbon brush 61 disposed inside.

If the coupler 2 is adapted for coupling to the blade (rotary object 1) of the lawn mower, then it includes a shaft-like head 21 and a plurality of flanges 22 distributed around the periphery of the shaft-like head 21, as shown in FIGS. 1 to 4. The shaft-like head 21 is inserted into an axial hole of the blade that is secured thereon by means of nuts 24. The flanges 22 are inserted into notches or holes 11 pre-formed in the blade for compelling the blade to rotate with the shaft-like head 21 during rotation.

Electric currents supplied by the power supply means 6 are transmitted via the carbon brushes 61 to the conductive ring 44 so that the coils 41 may generate an electromagnetic field with the permanent magnets 51 at the periphery of the fixed element 5 after receiving the electric currents. The rotary element 4 and the coupler 2 as well as the rotary object 1 such as the blade are driven to rotate simultaneously.

FIG. 4 shows a second preferred embodiment of the device of the present invention. The distinction between the first preferred embodiment and the second preferred embodiment is that, in the second preferred embodiment, the permanent magnets 51 and their metal rings 52 are radially distributed at the inner rim of the rotary element 4, while the coils 41 are correspondingly arranged around the periphery of the fixed element 5. The holes 54 used for receiving the carbon brushes 61 in the first preferred embodiment may be used for mounting therein small fans 89 to enhance movement of air, so as to facilitate dissipation of heat generated by the electromagnetic field generating device during rotation. Hence, carbon brushes and conductive ring are no longer necessary in this preferred embodiment. Instead, wires are employed to transmit electric currents directly to the coils 41 at the periphery of the fixed element 5. Certainly, the electric currents have to be first passed through an electronic phase converter 62 or equivalent elements, so that an electromagnetic field may be smoothly generated between the coils 41 and the permanent magnets 51 to drive the rotary element 4. As for the other elements in the second preferred embodiment, they are substantially the same as those in the first preferred embodiment.

In the device and method according to the present invention, the rotary element rotates at the periphery of the fixed element by means of the changes in the magnetic line of force of the electromagnetic field, bringing the coupler to rotate therewith. The blade or the like disposed at the front end of the coupler may hence rotate therewith. Since all the rotary components of the device according to the present invention have a greater radius mass than those of the conventional motor, a greater rotational inertia may be generated, and a greater air current may be produced during rotation to dissipate the heat. Hence the work, temperature of the coils and power supply means will not rise and the resistance will not consequently increase, reducing power consumption. The device of the present invention is therefore more suitable for prolonged operation.

Although the present invention has been illustrated and described with reference to the preferred embodiments thereof, it should be understood that it is in no way limited to the details of such embodiments, but is capable of numerous modifications within the scope of the appended claims.

What is claimed is:

1. An electricity driven device for rotating a rotary object to increase the rotational inertia of the rotary object, said device comprising:

a fixed and non-rotating main shaft;

a fixed element secured with said main shaft;

a rotary element arranged so as to rotate about said fixed element at a periphery of said fixed element;

a coupler for securing with said rotary object;

an electromagnetic field generating device comprising a first part and a second part, a plurality of coils and a plurality of permanent magnets being provided between said first part and said second part such that an electromagnetic field is generated therebetween when said coils are supplied with electric current, so that said first part and said second part perform relative rotation;

said first part of said electromagnetic field generating device being secured on said fixed element, and said second part thereof being secured on said rotary element;

said coupler being coupled to said rotary object and pivotally disposed on said main shaft, such that when said rotary element rotates, said coupler and said rotary object coupled thereto rotate therewith to increase the rotational inertia; and a power supply for transmitting power to said coils.

2. An electricity driven device as claimed in claim 1, wherein said rotary object is selected from the group consisting of a blade of a lawn mower, a grinding wheel and a disc saw.

3. An electricity driven device as claimed in claim 1, wherein said fixed element is formed of insulated engineering plastic, and said permanent magnets are united with said fixed element and secured to the periphery of said fixed element.

4. An electricity driven device as claimed in claim 3, wherein each of said permanent magnets is provided with a metal ring at a bottom side thereof to serve as a magnetic path.

5. An electricity driven device as claimed in claim 1, wherein said fixed element has a recess in the center thereof, and said rotary element has a first vane wheel pivotally provided on said main shaft, said first vane wheel being located in said recess of said fixed element and secured to said rotary element so that a centrifugal air current is generated during rotation of said rotary element.

6. An electricity driven device as claimed in claim 1, wherein said rotary element has secured thereon a conductive ring with a plurality of conductive sheets which are radially distributed, each of said conductive sheets having an outer end and an inner end, said outer end being connected with one of said coils.

7. An electricity driven device as claimed in claim 1, wherein said coupler of said rotary element has a shaft-like head and a plurality of flanges distributed at the periphery of said shaft-like head.

8. An electricity driven device as claimed in claim 1, wherein said rotary element has a housing for covering said fixed element, said electromagnetic field generating device, said rotary element, said coupler and an end portion of said main shaft.

9. An electricity driven device as claimed in claim 1, wherein said fixed element is provided with a plurality of radially distributed axial holes for receiving a plurality of carbon brushes.

10. An electricity driven device as claimed in claim 6, wherein said rotary element is further provided with a second vane wheel disposed in a position surrounded by said conductive ring for generating a centrifugal air current.

11. An electricity driven device as claimed in claim 7, wherein said shaft-like head of said coupler of said rotary element is inserted into an axial hole of said rotary object, said rotary object having a plurality of holes provided around said axial hole for receiving said flanges of said coupler of said rotary element.

12. An electricity driven device as claimed in claim 9, wherein said rotary element has a housing covering each of said permanent magnets of said fixed element, an end portion of said main shaft, said fixed element, said rotary element, said coupler and said electromagnetic field generating device, said housing having provided thereon at least one hole which shares a center line with one of said axial holes which are radially distributed on said fixed element, said hole of said housing being provided with a cap thereon.

13. An electricity driven device as claimed in claim 1, wherein said fixed element has mounted thereon small fans for dissipating the heat generated by said electromagnetic field generating device during rotation.

14. An electricity driven device adapted for use in a lawn mower to increase the rotational inertia of a blade of the lawn mower mounted on said device, said device comprising:

a fixed and non-rotating main shaft;

a fixed element secured with said main shaft;

an electromagnetic field generating device having a first part and a second part, a plurality of coils and a plurality of permanent magnets being provided between said first part and said second part such that an electromagnetic field is generated therebetween when said coils are supplied with electric currents;

a rotary element generating relative rotational movement with said fixed element by means of said electromagnetic field;

a coupler for mounting said blade;

power supply means for transmitting electric currents to said coils;

said rotary element being pivotally provided on said main shaft by means of a bearing and having one part thereof extending around said fixed element with the other part thereof extending to a front end of said main shaft to form said coupler on which said blade is mounted; and said first part of said electromagnetic field generating device being secured at the periphery of said fixed element while said second part thereof being secured at an inner rim of said rotary element.

15. An electricity driven device as claimed in claim 14, wherein said fixed element is formed of insulated engineering plastic, and said permanent magnets are united with said fixed element and secured at the periphery of said fixed element.

16. An electricity driven device as claimed in claim 15, wherein each of said permanent magnet is provided with a metal ring at a bottom side thereof to serve as a magnetic path.

17. An electricity driven device as claimed in claim 14, wherein said fixed element is provided with a recess in the center thereof and said rotary element has a first vane wheel pivotally provided on said main shaft, said first vane wheel being located in said recess of said fixed element and secured with said rotary element to generate a centrifugal air current during rotation of said rotary element.

18. An electricity driven device as claimed in claim 14, wherein said rotary element has secured thereon a conductive ring with a plurality of conductive sheets which are radially distributed, each of said conductive sheets having an outer end and an inner end, said outer end being connected with one of said coils.

19. An electricity driven device as claimed in claim 14, wherein said coupler of said rotary object has a shaft-like head and a plurality of flanges disposed around the periphery of said shaft-like head.

20. An electricity driven device as claimed in claim 14, wherein said rotary element has a housing for covering said fixed element, said electromagnetic field generating device, said rotary element, said coupler, said power supply means and an end portion of said main shaft.

21. An electricity driven device as claimed in claim 14, wherein said fixed element is provided with a plurality of axial holes which are radially disposed for receiving a plurality of carbon brushes.

22. An electricity driven device as claimed in claim 14, wherein said fixed element has mounted thereon small fans for dissipating the heat generated by said electromagnetic field generating device during rotation.

23. An electricity driven device as claimed in claim 19, wherein said rotary element is further provided with a second vane wheel disposed at a position surrounded by said conductive ring for generating a centrifugal air current.

24. An electricity driven device as claimed in claim 19, wherein said rotary object has an axial hole in the center thereof for receiving said shaft-like head of said coupler of said rotary element and a plurality of holes disposed around said axial hole for receiving said flanges of said coupler of said rotary element.

25. An electricity driven device as claimed in claim 21, wherein said rotary element has a housing for covering each of said permanent magnets of said fixed element, an end portion of said main shaft, said fixed element, said rotary element, said coupler and said electromagnetic field generating device, said housing having provided thereon at least one hole which shares a center line with one of said axial holes which are radially distributed on said fixed element, said hole of said housing being provided with a cap thereon.

\* \* \* \* \*